Oct. 2, 1934.   G. M. CROSS   1,975,314
SCROLL SAW
Filed Aug. 31, 1932   2 Sheets-Sheet 1

Inventor
Grosvenor M. Cross
by Heard Smith & Tennant.
Attys.

Oct. 2, 1934.  G. M. CROSS  1,975,314
SCROLL SAW
Filed Aug. 31, 1932   2 Sheets-Sheet 2
Fig. 3.  Fig. 4.  Fig. 5.
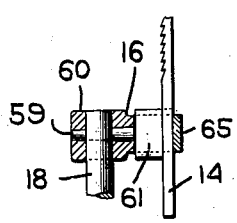
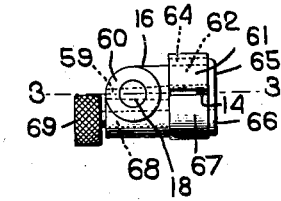
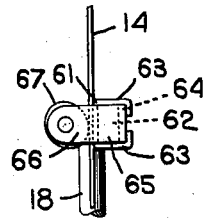
Fig. 6.
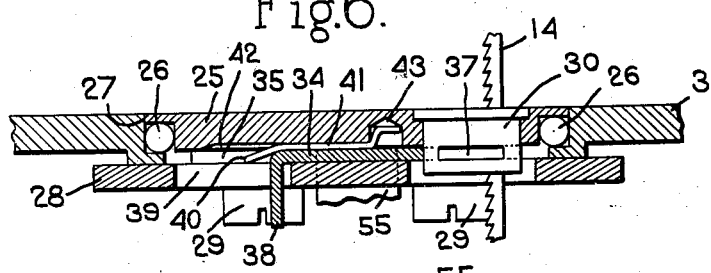
Fig. 7.
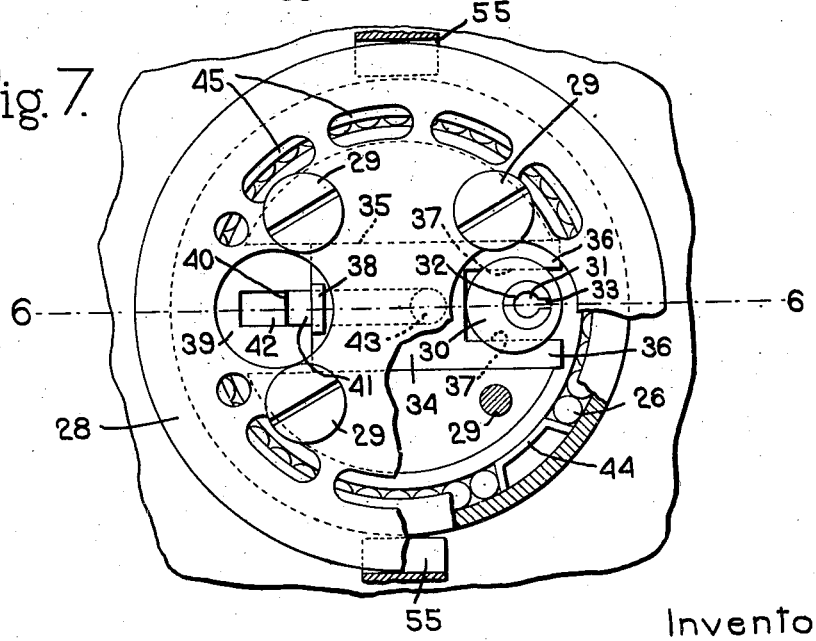
Inventor.
Grosvenor M. Cross
by Heard Smith & Tennant.
Attys.

Patented Oct. 2, 1934

1,975,314

UNITED STATES PATENT OFFICE 1,975,314

SCROLL SAW

Grosvenor M. Cross, Beaver Bay, Minn.

Application August 31, 1932, Serial No. 631,183

4 Claims. (Cl. 143—75)

This invention relates to improvements in scroll saws and has for its general object to provide a device of this type in which the saw may be caused to follow any path including curves of large or small radius accurately with a minimum of effort and without rotating the work.

The object of the invention is further to provide a scroll saw in which the saw is freely movable bodily about and parallel with its axis of reciprocation.

The object of the invention is further to provide in a machine of the type above referred to a throat plate through which the saw reciprocates which is free to move with the bodily movements of the saw.

A further object of the invention is to provide means selectively to lock the saw against, or permit to have free, bodily arcuate movement.

A further object of the invention is to provide anti-friction bearings at such points where relative movement occurs between the frame of the device and the saw in its bodily movement in an arcuate path.

Other objects and features of the invention will more fully appear from the accompanying specification and drawings and will be particularly pointed out in the claims.

The principles of the invention may be readily applied to scroll saws of any type. In the preferred form of the invention the saw blade is mounted in an especially constructed saw supporting means wherein the ends of the saw are clamped in the outer ends of a pair of supporting arms which are in turn pivoted or journaled in the usual saw-actuating members, one of which is above the work support and one below. The saw is therefore free to move bodily in an arcuate path about and parallel to the axis upon which the saw supporting means are pivoted. Any suitable means may be employed for reciprocating the saw-actuating members such as an eccentric driven by a suitable source of power and connected to one or both of the saw actuating members.

In order to provide adequate support for the work during the sawing operation, a specially constructed throat plate is provided which is rotatable upon an axis coinciding with the axis about which the saw has its arcuate movement. In order to provide adequate support for the back of the saw blade to resist the pressure of the work thereagainst, a saw guide is inserted in the throat plate through which the saw reciprocates. The saw guide is provided with a rectangular slot in which the back of the saw blade moves. The saw guide has means associated therewith for providing for its ready removal and replacement, thereby facilitating the interchange of saw guides for various sizes of saw blades. The features above presented, together with other features, will be described more fully in the following detailed description.

In the drawings:

Fig. 3 is a cross section on line 3—3, Fig. 4.

Fig. 4 is a plan view of the saw-clamping means showing the saw in cross section.

Fig. 5 is a side elevation of the saw-clamping means.

Fig. 6 is a cross section on line 6—6, Fig. 7.

Fig. 7 is an enlarged bottom plan view of the rotatable throat plate with parts of the elements thereof broken away.

Figure 1:
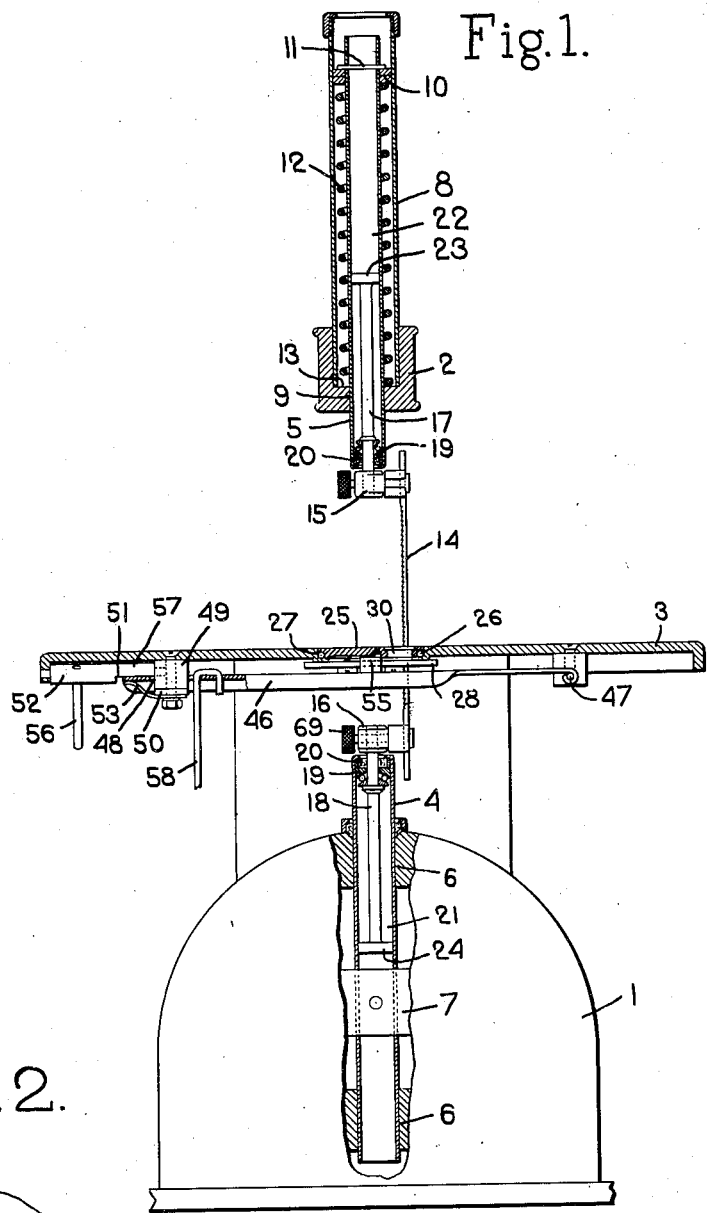
Fig. 1 is a front elevation of a preferred embodiment of the invention showing the principal features thereof in cross section.
Figure 2:
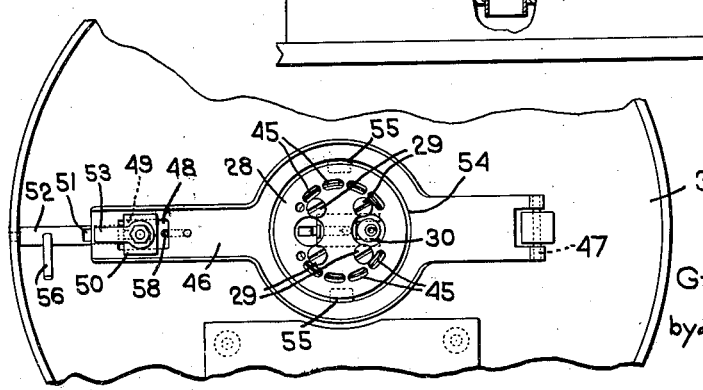
Fig. 2 is a bottom plan view partially broken away of the work support.

In the particular embodiment illustrated, the saw-actuating mechanism comprises a lower driven member to which the lower end of the saw is secured and an upper member in which the upper end of the saw is secured. The upper saw-actuating member receives its downward motion from the lower member through the connection of the saw therewith. The upward travel of the upper actuating member is obtained by the action of a spring which is tensioned during the downward stroke. The principles of the invention are equally well adapted, however, to scroll saws of the more conventional type in which the upper and lower saw-actuating members are driven by means of relatively long, horizontal, pivoted arms which are connected at their ends remote from the saw by a link or similar connecting element.

The frame of the machine is composed of a base member 1 and an upper supporting member 2 situated above the work support 3. The work support 3 is desirably rigidly secured to the base member 1. The supporting member 2 is rigidly connected to the base 1 by means of the usual overhanging arm or horn, not shown in the drawings. The saw is axially reciprocated by means of the actuating members 4 and 5 which desirably are constructed of relatively light steel tubing. The actuating member 4 is slidable vertically in ways 6 formed in the base 1 and is given its reciprocatory motion by means of a cross head 7 which in turn is actuated by an eccentric, a pin and crank mechanism, or any other suitable driving means not shown.

The upper saw-actuating member 5 is vertically slidable within a housing tube 8 fixed rigidly in the upper member 2 of the frame and in alignment with the actuating member 4. The actuating member 5 is desirably made of hollow tubing in order to reduce its inertia and thereby enable high speeds to be attained without undue vibration and strain upon the saw. The lower end of the actuating member 5 moves within a way 9 formed in the upper member 2 of the frame, while its upper end is provided with an annular shoulder such as a washer 10 retained thereon by a transverse pin 11. The shoulder 10 of the actuator slides freely within the tube and serves to guide the upper end of the member 5. A compression spring 12 surrounds the member 5 and bears at its lower end against a shoulder 13 formed in the member 2 of the frame and at its upper end against the shoulder 10. The member 5 is thereby urged upward and maintains tension in the saw 14. While it has been found that the construction of the actuating members as above described is highly efficient, it will be understood that any suitable construction may be followed.

The saw 14 is mounted in the actuating members 4 and 5 in a manner to permit it to move bodily in an arcuate path eccentric to the vertical axis of the actuating members and during such movement to maintain a parallel relation to that axis. This may be accomplished in any suitable manner and, as illustrated herein, the saw is clamped at its ends in the outer ends of a pair of laterally extending arms 15 and 16 which are in turn pivoted or journaled at their inner ends upon the vertical axis of the actuating members. The arms 15 and 16 are provided respectively at their axes with vertical shafts 17 and 18. The shafts 17 and 18 are desirably journalled at their ends adjacent the work support in ball bearings 19, the stationary element of which is retained in the respective saw actuating members by a lip spun inward from the walls thereof. It is desirable also that a suitable packing 20 of felt or other similar material be inserted between the inturned lips and the bearings to prevent sawdust and other foreign matter from reaching the bearings and also to maintain adequate lubrication in the bearings. In order to render the shafts vertically stable, they are extended a substantial distance into the central chambers 21 and 22 of the actuating members and are provided at their free ends with piston-like bearings 23 and 24 which are freely rotatable within the chambers 21 and 22. It will thus be seen that each shaft 17 and 18 is provided adjacent one end with an antifriction bearing which both takes the thrust or pull of the saw and forms a lateral bearing while each shaft is provided adjacent the other end with a bearing which preferably acts simply as a lateral bearing. The saw blade is thereby rendered free to move about the shafts 17 and 18 as an axis and is clamped in such position that it always extends radially of the axis of the shafts with its toothed edge always facing the said axis.

The saw 14 must pass through the work support 3 and for this purpose an opening must be provided therein. This opening must permit the saw to move in its bodily arcuate path. The saw is, of course, rendered workable by forming a large aperture in the work support to permit such movement of the saw. It is more desirable, however, to bring the work supporting surface close to the saw. This result may be accomplished in any suitable manner. A preferred construction is shown herein and comprises a throat plate 25 rotatably mounted in the work plate on an axis coincident with the axis of the shafts 17 and 18. The throat plate 25 may be in the form of a disk, as illustrated herein, or it may be of other construction such as a portion of an annular ring movable in an annular slot in the work support. In order that the bodily movement of the saw shall be sensitive in response to the feeding movements of the work, the throat plate 25 is desirably mounted upon a ball bearing 26. The upper section of the ball race of the bearing 26 is preferably formed in the periphery of the throat plate 25 and the lower section of the bearing formed in the periphery of an aperture 27 in the work support. The throat plate 25 is inserted in the aperture 27 from above. The ball race of the bearing is properly proportioned to maintain the surface of the throat plate flush with the upper surface of the work support. The throat plate 25 is prevented from being detached from the work support by means of a retainer plate 28 which is secured to the throat plate by means of screws 29. The plate 28 is of sufficiently large diameter to underlie the bottom surface of the ball race of the bearing 26 and is spaced slightly therefrom to allow free action of the bearing.

A hardened saw guide 30 is inserted in the throat plate offset from its center sufficiently to coincide with the path of reciprocation of the saw and permit the saw to move therethrough. A slot 31 is formed in the saw guide having in general a keyhole shape, its rounded portion 32 providing clearance for the saw teeth and its rectangular portion 33 acting as a guide and support for the back of the saw.

It is desirable that the saw guide be interchangeable to accommodate saws of various sizes. One desirable method of accomplishing this result is to provide a locking slide 34 which is slidably received in a slot 35 in the bottom face of the throat plate 25. One end of the slide 32 is bifurcated to form leg sections 36 which normally embrace the saw guide 30. The guide 30 is preferably cylindrical and is provided with grooves 37 formed in the sides thereof in which the leg sections 36 of the slide 34 are received. The saw guide 30 is thereby prevented from being laterally withdrawn and from rotation within the throat plate.

The end of the slide 34 opposite its bifurcated end is reduced in width and the reduced portion bent downwardly to form an actuating handle 38 projecting through an opening 39 in the retaining plate 28. When the slide 34 is in its locking position, as shown in the drawings, the downwardly bent tail portion 40 of a retaining spring 41 engages the reduced end of the slide 34 and prevents its jarring out of locking position. The spring 41 is received in a slot 42 in the plate 25. The inner end of the spring 41 is depressed into a recess 43 to prevent longitudinal movement thereof. When it is desired to remove the guide 30, the slide 34 is retracted by means of the handle 38 against the action of the spring 41, which in turn acts frictionally to retain the slide in retracted position during replacement of a saw guide having a slot to accommodate a different size of saw. The plate 28 has an aperture therein beneath the saw guide to provide room for the saw and permit a guide of substantial depth to be employed.

To insure that the ball bearing 26 will not become clogged with sawdust or other foreign matter, one or more scavenger members 44 are inserted in the ball race of the bearing 26. The ends of the scavengers are angular with respect to the radial line of the bearing and as they move about the ball race by reason of engagement with the balls, the accumulated sawdust or other foreign matter within the ball race is scraped from the walls thereof and falls downwardly through a plurality of apertures 45 formed in the plate 28 for that purpose. While the above described construction of the throat plate and its cooperating elements is found to be satisfactory, other suitable constructions may be employed.

Means are provided for locking the throat plate against rotation, thereby preventing arcuate movement of the saw. This locking feature is provided for certain special uses of the saw such as making long straight cuts in the work or for starting a cut in the work at an angle to its edge. Any desired construction may be employed for locking the throat plate. As shown herein, a locking lever 46 is provided which is pivoted at 47 upon the lower face of the work plate 3 at one of its ends and at its other end is provided with an aperture 48 through which a retaining post 49 projects. The retaining post has secured to its lower end a plate 50 which projects beyond the limits of the aperture 48 and thereby acts as a limiting stop to downward movement of the lever 46. The lever 46 is held upwardly against the flat face 51 of a rotatable locking member 52 by means of a flat spring 53 bearing against the end of the lever 46. The lever 46 extends substantially diametrically across the work support 3 and is provided at its central portion with an aperture 54 slightly larger than the plate 28, thereby permitting free movement of the throat plate about its axis. The lever 46 is provided with upwardly extending locking arms 55 having a vertical portion which projects upwardly adjacent to the periphery of the plate 28 and a horizontal portion which projects inwardly over the edge thereof in such position that it is spaced slightly from the upper face of the plate 28 when the locking lever 46 is in its unlocked position, as shown in the drawings. When, however, it is desired to lock the throat plate, the rotatable locking member 52 is rotated about its axis by means of a suitable handle 56 until the end of the lever 46 is forced downwardly by reason of its contact with the cylindrical portion 57 of the locking member 52. When the lever 46 is thus forced downwardly, the horizontal portion of the members 55 engages the upper face of the plate 28 and thereby frictionally prevents rotation of the throat plate 25. If desired, the locking of the throat plate 25 may be accomplished by means of a foot lever, not shown in the drawings, which is connected to a link 58, the upper end of which is secured in the lever 46. When the foot lever is actuated downward, the link 58 causes downward motion of the lever 46 against the action of the spring 53, thereby locking the plate 25 against rotation and when the foot lever is released the spring 53 again acts to release the throat plate.

The ends of the saw 14 are engaged by specially constructed clamping means upon the ends of the arms 15 and 16. The elements of the clamping means are incorporated in the arms themselves and for that reason the arms actually constitute a frame upon which the elements of the clamping means are mounted. The clamping means upon the ends of both of the shafts are identical in construction so that only one of the clamps will be described in connection with the arm 16. The arm 16 is secured to the upper end of the shaft 18 by means of a taper pin 59 extending through the boss 60 formed on the arm and also through the end of the shaft. The clamping means is composed of a fixed jaw 61 which is preferably of hardened metal and generally U shape in form which embraces a projection 62 extending outwardly from the arm 16 which is rectangular in form. The horizontal leg sections 63 of the U-shaped jaw extend outwardly and embrace one leg 64 of a right angled supporting arm 65. The other leg 66 of the supporting arm 65 extends across the end of the extension 62 and a substantial distance beyond. The extreme outer ends of the leg sections 63 of the U-shaped jaw are bent over the outer face of the leg 64 of the supporting member 65, thereby clamping the support 65 firmly in position. The cooperating jaw 67 of the clamp is in the form of an eccentric cam mounted upon a shaft 68 which is journalled in the arm 16 and has mounted on its end opposite to the jaw 67 a knurled hand wheel 69. The shaft 68 extends slightly beyond the jaw 67 and is journalled in the outer end of the leg 66 of the supporting member 65. The saw 14 is clamped between the fixed jaw 61 and the eccentric cam jaw 67. The jaw 67 is so constructed that when in engagement with the saw, the tension in the saw tends to increase the pressure of the jaw 67 thereagainst. The greater the tension in the saw, the greater is the clamping force of the jaw 67. To release the clamp, the knurled wheel 69 is rotated in the proper direction to cause its cam surface to move out of engagement with the saw. The supporting member 65 lies in contact with the outer face of both of the jaws 61 and 67 and thereby constitutes a stop against which the back of the saw 14 may rest, thus preventing its lateral displacement from the jaws and also serving as an accurate means of properly positioning the saw. The clamping surfaces of the jaws are preferably positioned in alignment with the axis of the shaft 18.

A scroll saw constructed according to the above description functions in a manner radically different from the conventional scroll saw wherein the saw reciprocates in a fixed plane. Under such conditions the saw is caused to follow the curves of the design desired in the finished work by rotation of the work about the saw as an axis. Such is not the case in the present device. As the work is fed against the saw in the present invention, its path through the work may be guided at will by moving the work bodily forward toward the saw, laterally with relation to the forward movement, or diagonally with relation to the forward movement without rotating the work about the saw. In sawing a straight kerf in the work, the saw will automatically assume a position to the rear of the pivotal point about which it has its arcuate movement with relation to the forward motion of the work and, so long as the motion of the work is directly forward, the saw will remain in that position. However, when a lateral motion is introduced in the feeding movement, the saw will move away from its directly rearward position and saw a curved kerf in the work which will have a radius which may be determined by the operator of the machine by properly proportioning the speed of the forward motion of the work in relation to the amount of lateral motion of the work. In other words, the operator may cause the saw to cut along any path, straight or curved, and without rotating the work, simply by feeding the work against the saw in the proper direction or in such a direction as to form each successive increment of the kerf radial to the axis of bodily rotative movement of the saw. In the device of this invention the saw blade always extends radial to this axis and the saw blade shifts bodily about and parallel with this axis with each incremental change in the curvature of the path being cut. The operator consequently, without rotating the work and by feeding the work toward the saw in any direction away from the axis, will cause the saw to cut along any desired path.

It will be apparent from the foregoing description of the operation of the machine that the execution of intricate curves of large and small radius by means of the present invention is greatly facilitated, especially when manipulating large pieces of work. For instance, if the design being followed calls for a curve of small radius at some point within its area, with the conventional type of saw the work must be swung bodily about its center and the curve during such rotation of the work must be followed accurately, which is a difficult thing to do and consumes more time than is necessary to execute the same curve with the present invention. Furthermore, it frequently happens when the work is large that the overhang of the arm supporting the upper saw-actuating member is insufficient to permit the work to swing sufficiently to execute the necessary curves. The scope of the work which the conventional type of machine can execute is thereby greatly limited. The present device therefore provides an efficient, rapid means of executing intricate designs as well as cutting accurate, straight saw kerfs and, furthermore, the full scope of the dimensions of the device may be utilized.

Having thus described the invention, what is claimed as new, and desired to be secured by Letters Patent, is:

1. A scroll saw comprising a frame, a work support on said frame, a pair of saw reciprocating members, one above and one below said work support, freely rotatable saw holding means journaled upon each of said reciprocating members with the said journals axially aligned, a saw secured at its ends in said saw-holding means parallel with and eccentric to their journals, a throat plate in said work support freely rotatable about an axis coincident with said journal axis and having an eccentrically positioned slot through which the saw moves, the said elements acting to cause the saw to cut along any path without rotation of the work by feeding the work against the saw to form each successive increment of the kerf radial of said axis, and the throat plate to follow the saw in its bodily movement resulting from such feeding of the work, and means to lock said throat plate against rotation to prevent bodily arcuate movement of the saw when desired.

2. A scroll saw comprising a frame, a work support, saw actuating means reciprocable in said frame, saw holding means pivotally mounted upon said actuating means, a saw secured in said holding means parallel with and eccentric to its pivotal axis, means connected to and acting axially to reciprocate said saw-actuating means and thus to reciprocate said saw through said work support, a throat plate in said work support rotatable about an axis coincident with the axis of said saw holding means, a removable slotted saw guide mounted eccentrically in said throat plate through which the saw moves, and means detachably to lock said saw guide in position in the throat plate, whereby the saw will cut along any path without rotation of the work by feeding the work against the saw to form each successive increment of the kerf radial of said axis and the throat plate will follow the saw in its bodily movement resulting from such feeding of the work.

3. A scroll saw comprising a frame, a work support, a pair of saw actuating members reciprocable in axial alignment in said frame one above and one below said work support, a pair of axially aligned extended shafts freely rotatable in axial alignment one in each of said actuating members, a saw secured at its ends to said shafts eccentrically of the axis thereof, an anti-friction thrust and lateral bearing between each of said shafts and the actuating member in which it is mounted adjacent one end of said shaft and a lateral bearing between each of said shafts and the actuating member in which it is mounted adjacent the other end of said shaft.

4. A scroll saw comprising a frame, a work support, saw supporting means pivotally mounted on said frame, a saw mounted in the supporting means parallel with and eccentric to its pivotal axis, means axially to reciprocate said saw supporting means to cause the saw to cut along any path without rotation of the work by feeding the work against the saw to form each successive increment of the kerf radial of said axis, and means operable to maintain the saw against movement about the said pivotal axis when desired.

GROSVENOR M. CROSS.